Figure 1:
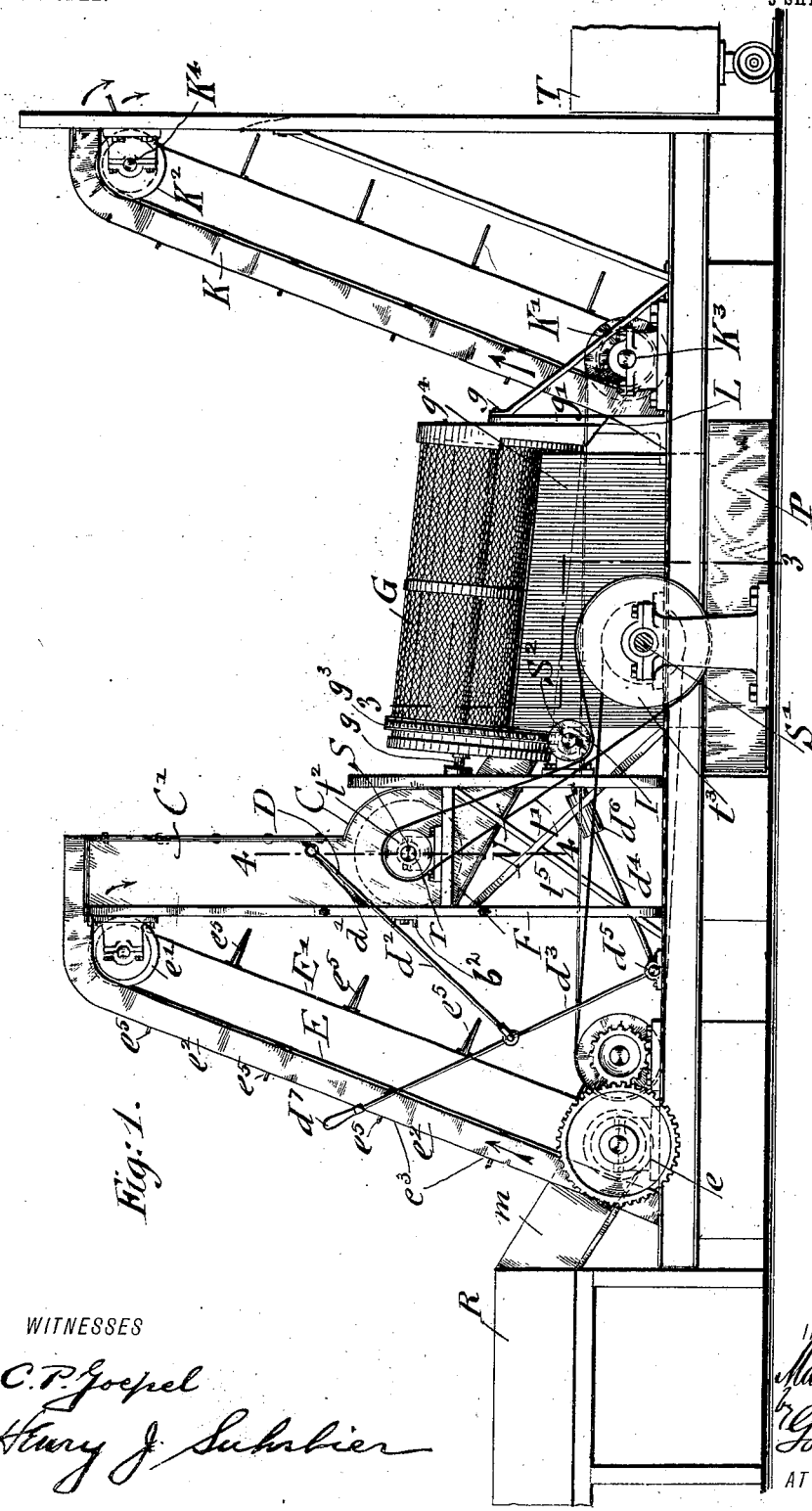

No. 744,572. PATENTED NOV. 17, 1903.
M. LEMBERG.
MACHINE FOR CUTTING UP TIN SCRAPS.
APPLICATION FILED APR. 25, 1903.
NO MODEL. 3 SHEETS—SHEET 1.

WITNESSES
C. P. Joepel
Henry J. Suhrbier

INVENTOR
Max Lemberg
by
Joquer Niles
ATTORNEYS.

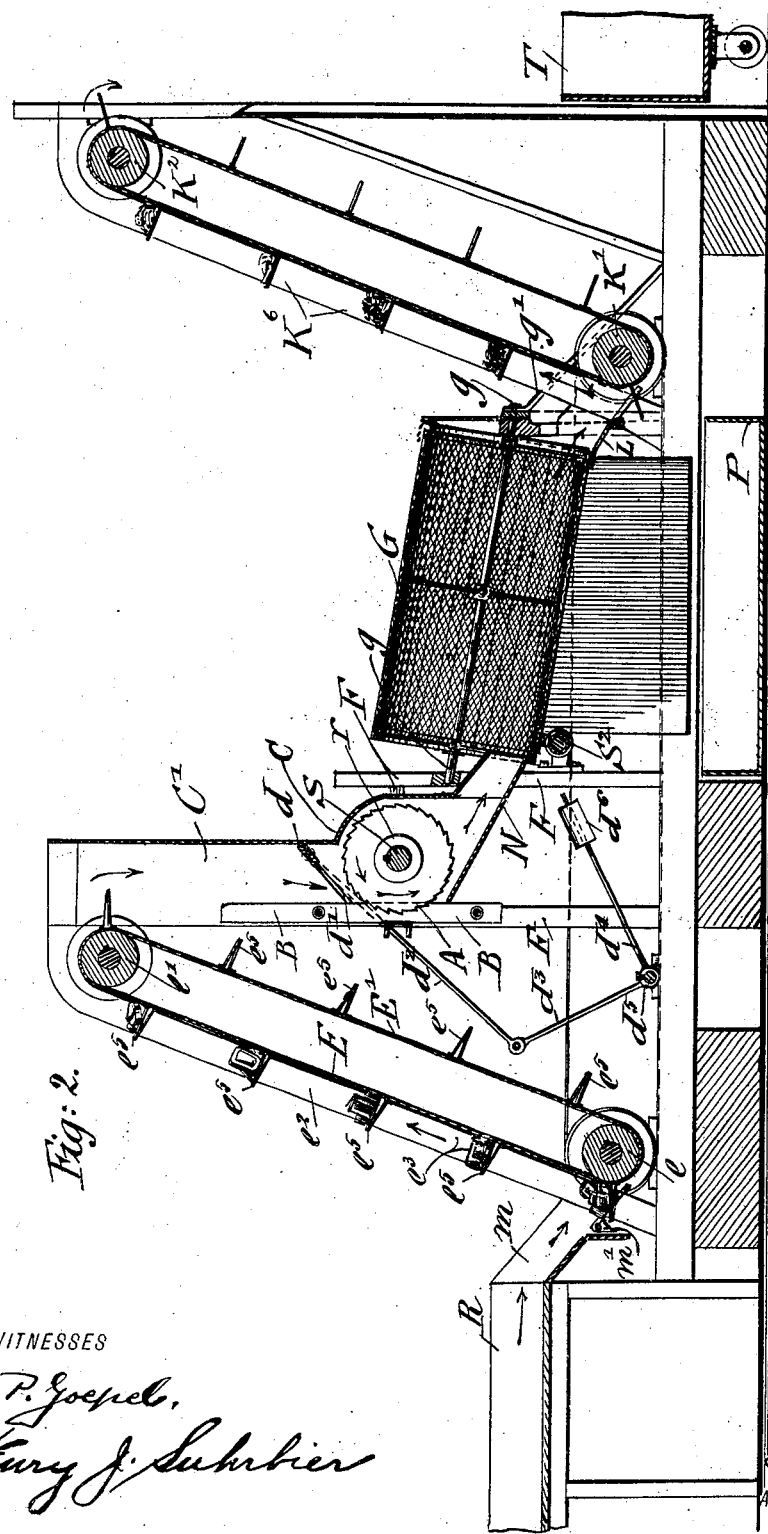

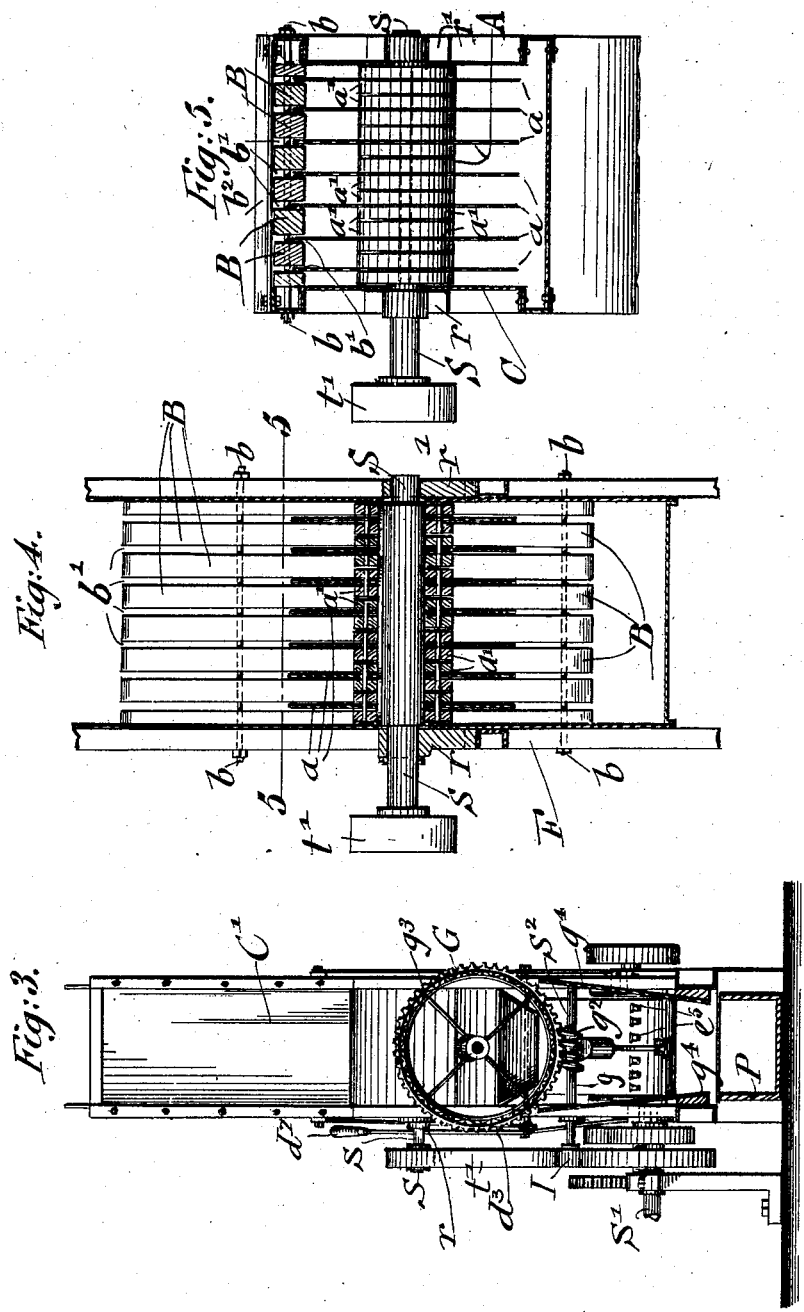

No. 744,572. Patented November 17, 1903.

UNITED STATES PATENT OFFICE.

MAX LEMBERG, OF SEWAREN, NEW JERSEY, ASSIGNOR TO THE VULCAN DETINNING COMPANY, OF NEW YORK, N. Y., A CORPORATION OF NEW JERSEY.

MACHINE FOR CUTTING UP TIN SCRAPS.

SPECIFICATION forming part of Letters Patent No. 744,572, dated November 17, 1903.

Application filed April 25, 1903. Serial No. 154,310. (No model.)

*To all whom it may concern:*

Be it known that I, MAX LEMBERG, a citizen of the United States, residing in Sewaren, in the county of Middlesex and State of New Jersey, have invented certain new and useful Improvements in Machines for Cutting up Tin Scraps, of which the following is a specification.

This invention relates to an improved machine for cutting up tin scraps preparatory to detinning the same by electrolysis, the machine being designed with a view of cutting up larger and bulky tin articles, as tin cans, and separating the cut-up scraps from any mechanically-adhering impurities before they are subjected to the electric current for regaining the tin on the same; and for this purpose the invention consists of a machine for cutting up tin scraps which comprises a gang of rotary saws, a casing for the same open at its upper and lower ends, means for conveying the bulky tin scraps to the upper end of said casing, means above and in proximity to said saws for pressing the bulkier scraps in downward direction toward the saws for cutting them up, and means for conveying off the cut-up scraps from the lower open end of the casing.

The invention consists, further, of a quickly-rotated gang of saws, means for separating said saws, and upright blocks separated by suitable interstices for permitting the saws to enter between the blocks for effectively cutting up the material fed to the saws; and the invention consists, lastly, of certain details of construction and combinations of parts, which will be fully described hereinafter and finally pointed out in the claims.

In the accompanying drawings, Figure 1 represents a side elevation of my improved machine for cutting up tin scraps. Fig. 2 is a vertical longitudinal section of the machine. Fig. 3 is a vertical transverse section on line 3 3, Fig. 1. Fig. 4 is a vertical transverse section on line 4 4, Fig. 1; and Fig. 5 is a horizontal section on line 5 5, Fig. 4, Figs. 4 and 5 being drawn on a larger scale.

Similar letters of reference indicate corresponding parts.

Referring to the drawings, A represents a gang of circular saws which is securely fastened to a strong shaft S and which consists of a plurality of saws $a$, which are held by disks $a'$, which are so placed that the same are a certain distance apart. Rotary motion is imparted to the shaft S from a counter-shaft S' by a belt $t'$ and pulleys $t^2$ and $t^3$ and an idler I, by which the proper tension of the belt is kept up. The shaft S is supported in bearings $r$ $r'$ of pillow-blocks, which are supported on a suitable frame F, as shown in Fig. 1. At one side of the gang of saws is supported a number of vertical blocks B, between which interstices $b'$ are arranged for permitting the saws to enter to some extent between the blocks. The blocks B are connected transversely by stout bolts $b$ and by a strong angle-iron $b^2$, which is bolted to the supporting-frame of the blocks, as shown in Figs. 1 and 5. The gang of saws is surrounded by a concentric casing C, which extends in upward direction, so as to form a conveying-trunk C', the upper end of which is connected with the delivery end of an inclined endless elevator E, which consists of an endless band or apron E', provided with a plurality of series of struts $e^5$ at definite intervals apart. The lower driving-roller $e$ of the elevator E receives rotary motion by suitable transmission from the driving counter-shaft S', while the upper guide-roller $e'$ is supported in bearings at the upper end of the trunk C'. The tin scraps, which consist chiefly of tin cans, are conveyed from a suitable receptacle R by a chute $m$ to a number of pivoted struts $m'$, arranged one next to the other and at such a distance apart as to permit the struts $e^5$ of the endless belt or apron E' of the elevator E to pass in between the same, whereby the material resting on the struts $m'$ is carried upwardly by the struts $e^5$ to the top of the conveying-trunk C'. At both sides of the belt E' are arranged guide-flanges $e^2$, which form, with the struts $e^5$, buckets and which are of such height as to prevent the bulkier tin scraps from being dropped sidewise out of the buckets $e^3$. Instead of the buckets $e^3$, formed by the struts $e^5$ and apron $e^2$, buckets of any approved construction, preferably of stout sheet metal, reinforced by suitable stays or braces, may be used, which are then attached by rivets or otherwise to the endless belt E'. The scrap delivered in the upper part of the chute C' drops in downward direction on the gang of saws, which being rotated in the direction of the arrows shown in Fig. 2 force the scraps over toward the upright blocks, wedge them into the space formed between the blocks and the saw-blades, and cut them up into smaller pieces.

As in some cases large and bulky tin-scrap—such as larger tin cans, tin pails, &c.—are not readily sawed up, but bump up and down on the saws, a pressing device D is used, which consists of a bar $d$, that is guided in inclined slots $d'$ in the side walls of the trunk C'. The bar $d$ is connected by a pivot-rod $d^2$ with one arm $d^3$ of a fulcrumed elbow-lever pivoted at $d^5$, while the other or free arm $d^4$ is provided with a counterbalancing-weight $d^6$, by which the inclined presser-bar $d$ is held at the upper end of the guide-slots $d'$. When tin scraps are not readily sawed up, but bump up and down and are so prevented from being wedged in between the saws and blocks B, the attendant takes hold of handle $d^7$ of the lever-arm $d^3$ of the fulcrumed elbow-lever and moves thereby the presser-bar $d$ in downward direction against the pressure of its counterbalancing-weight $d^6$, so as to press on the bulkier tin scraps and force them into the apex of the angle formed between the blocks B and the saw-blades and subject them thereby to the cutting action of the saws. The scraps thus cut up by the gang of saws are conducted through a downwardly-inclined chute N at the lower end of the casing C to an inclined rotary drum G, which is formed of perforated sheet metal, strong wire-gauze, or other suitable material supported by suitable spider-frames. The shaft $g$ of the drum is supported in bearings of a suitable upright standard $g'$ and in the standard F, as shown in Figs. 1 and 2. Rotary motion is imparted to the drum G by means of a transverse shaft $S^2$, to which rotary motion is imparted by the driving-belt $t'$, passing over the pulley or idler I. A worm $g^2$ is mounted on the shaft $S^2$ and meshes with the worm-gear $g^3$ at the end of the drum, as shown in Figs. 1 and 3. The drum G serves for the purpose of taking up the tin-scrap cut up by the rotary saws and separating by friction with the reticulated body of the drum any adhering dirt from the tin-scrap, which then drops through the openings or meshes of the drum G into a receptacle P below the drum, which receptacle can be readily moved sidewise of the drum, so as to remove from time to time the accumulating dirt, nails, &c. At both sides of the drum are arranged vertical guard-plates $g^4$, which are so arranged as to converge toward each other, so as to conduct the dirt, &c., into the receptacle P and prevent any scattering of the same.

At the lower outgoing end of the drum is arranged a stationary chute L, over which the cut-up tin scraps are conducted to the buckets $K^6$ of a second elevator K, which is of the same height and general construction as the elevator E and which lifts the cut-up tin scraps to a certain height and then drops them into a truck T, by which they are conveyed to the detinning-baths for regaining the tin in the same. The lower guide-roller K' of the elevator K is driven by a suitable belt $t^5$ and supported in bearings $K^3$, while the upper guide-roller $K^2$ is suitably supported in bearings $K^4$.

By the machine described the large bulky waste articles of tin can be readily and quickly cut up into scraps of smaller size, such as required for treating the same by the electric current for regaining the tin on the same. Small cans can be readily cut up, but heretofore some difficulty was found in cutting up larger pieces of tin waste, so that they were heretofore not used in electrolytic detinning-works. By my improved machine, however, all sizes of large and bulky tin waste—as cans, &c—can be cut up quickly and with great facility, so as to prepare the scrap so that it can be used directly in the electrolytic detinning operations.

Having thus described my invention, I claim as new and desire to secure by Letters Patent—

1. In a machine for cutting up tin scraps, the combination, with a gang of rotary saws, a casing for the same open at its upper and lower ends, a conveying-trunk vertically above and connected with the open upper end of the casing, and a discharge-chute at the lower open end of the casing, of slots in said vertical trunk in proximity to and above the saws, and means movable in said slots for holding the bulky articles in position for the cutting-up action of the saws, substantially as set forth.

2. In a machine for cutting up tin scraps, the combination, with a gang of rotary saws, of upright blocks separated from each other for permitting the saws to project into the interstices between said blocks, and means above and in proximity to said saws for pressing the bulkier scraps in downward direction toward the blocks so as to hold the tin scraps in the apex of the angle between the saws and the upright blocks for cutting them up, substantially as set forth.

3. In a machine for cutting up tin scraps, the combination, with a gang of rotary saws, a casing for the same and inclined slots in said casing in proximity to and above the saws, of upright blocks separated from each other for permitting the saws to project into the interstices between said blocks, a presser-bar movable in said inclined slots, a weighted lever mechanism connected with the presser-bar for counterbalancing the same, and a lever for operating said lever mechanism for moving the presser-bar in downward direction for pressing the scraps into the angle between said gang of saws and blocks for subjecting the scraps to the cutting action of the saws, substantially as set forth.

4. In a machine for cutting up tin scraps, the combination with a gang of rotary saws, of means for conveying tin scraps to said saws, means above and in proximity to said saws to hold the bulky articles in position for the cutting-up action of the saws, and means for conducting off the cut-up scraps, substantially as set forth.

In testimony that I claim the foregoing as my invention I have signed my name in presence of two subscribing witnesses.

MAX LEMBERG.

Witnesses:
  PAUL GOEPEL,
  C. F. GOEPEL.